(12) United States Patent
Christie, IV et al.

(10) Patent No.: US 6,269,100 B1
(45) Date of Patent: Jul. 31, 2001

(54) CHANNEL TRANSFER WITH RETRIEVE

(75) Inventors: Samuel Henry Christie, IV, Cary; Patrick J. Dagert, Raleigh, both of NC (US)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/151,805

(22) Filed: Sep. 11, 1998

(51) Int. Cl.$^7$ ..................................................... H04J 3/02
(52) U.S. Cl. .................................................. 370/401
(58) Field of Search .................... 370/401, 389, 370/441, 351, 352, 238, 229, 464, 468, 465, 525, 524, 395; 340/825.79; 379/93.15, 219, 220, 225, 224, 234, 242, 240; 709/220, 221, 222

(56) References Cited

U.S. PATENT DOCUMENTS 6,081,508 * 6/2000 West et al. ........................ 370/229

* cited by examiner

*Primary Examiner*—Dang Ton

(57) ABSTRACT

Method and apparatus for transferring a call leg in a telecommunication network and releasing it to free up resources, while allowing retrieval at a later time under specified conditions. Message extensions are provided for interfaces used between service nodes and host switches in a telecommunication networks. The invention is appropriate for use in an integrated services digital network (ISDN), in an internet protocol (IP) telephony network, or in any other type of telecommunication network. The service node sends a transfer request and retrieval conditions -to the switch. The switch stores the conditions and transfers the channel with the appropriate call leg, but can retrieve the call leg when one of the conditions is met.

37 Claims, 5 Drawing Sheets

CHANNEL TRANSFER WITH RETRIEVE

BACKGROUND

1. Field of the Invention

The present invention relates to the transfer of call legs within a telecommunication network. While the invention is applicable to many different types of networks, it particularly lends itself to use in the transfer of B channels within an integrated services digital network (ISDN) telecommunication environment. The invention is applicable to B channel transfers where the B channels are part of a primary rate interface (PRI) or ISDN user part (ISUP) based trunk network.

2. Description of the Problem Solved

Businesses and enterprises that use the public telecommunication network typically require services such as call transfer, conference calling, and call forwarding. In many cases the services are supplied by service nodes which are connected to the public network switch which serves the particular enterprise. Examples of service nodes include voicemail systems and international call-back servers. For purposes of this disclosure, we also consider a PBX or any other type of privately owned telecommunication device to be a service node. In order to supply the services required by the enterprise, the switches and service nodes often have to maintain multiple call legs for a given call. Each call leg between a given switch and a given service node is connected via a channel which is part of an interface. In an ISDN environment each channel is a B channel, and the interface is either a primary rate interface or an ISUP controlled trunk.

There are numerous situations where multiple call legs might be used. As an example, consider a user who dials into a voicemail system. Typically, a voicemail system provides an option to press a key and immediately and automatically call a party back who has left a message. When the user executes this function, the voicemail system dials the party over a separate connection and internally connects the user and the party within the voicemail system. The voicemail system stays in the call path so that the user can resume listening to messages when the call between the user and the called party is complete. This call path results in two B channels between the switch and the voicemail system being used to connect the user and the called party. Alternatively, the voicemail system could dial the party and connect the user and the party by making a transfer such as the B channel transfer described in published Bellcore Standard GR-2865-Core, Issue 2, May 1997, which is incorporated herein by reference. This transfer frees up the two B channels between the switch and the voicemail system, but at a cost to the user. When the call between the user and the called party is complete, the user must re-dial the voicemail system to resume listening to voicemail messages.

The problem created by the situation is that service nodes and their network connected switches are required to have extra active ports for the sole purpose of holding access to calls which the service node may need to recover in the future under certain conditions. The extra ports cost money because additional equipment must be purchased and maintained to supply the required capacity. If a personal computer is being used as a service node, extra adapter cards must be purchased. If long distance charges apply, the extra long distance costs can be considerable. What is needed is a way to release and conditionally retrieve a call leg which goes unused for a period of time due to a call transfer or similar event. Ideally, call retrieval should be able to be based on the occurrence of one or more of a variety of events.

SUMMARY

The present invention solves the problem discussed above by providing message extensions to the interfaces for the purpose of identifying calls legs and calls. When joined in two party or conference calls the messages exchanged between the service node and the switch also supply conditions for retrieval. Conditions such as timer expiration, in-band tones, participant release, etc. all apply. When any specific condition is satisfied, the service node signals with the call identifier and port ID if appropriate. The new message permits the service node to specify the dispensation of the remaining call legs, including retrieving them to B channels attached to the service node.

The invention operates whenever at least a first and second call leg are connected between the switch and a service node. The service node sends a transferwith-retrieve message containing retrieval conditions to the switch. The switch receives the transfer-with-retrieve message, stores the retrieval conditions, and transfers the call leg. When the retrieval conditions are satisfied, the switch notifies the service node. The specific retrieval conditions used can be selected by one of ordinary skill in the art who is designing the particular telecommunication system. Examples of possible retrieval conditions include the lapse of a specified interval of time, the receipt of specific in-band tones, and participant release. In one embodiment, the switch automatically retrieves and reconnects the call at the same time. In another embodiment, the switch waits for specific retrieval instructions from the service node. Although this method works in variety of communications systems, in the preferred embodiment the network involved is an integrated services digital network (ISDN) and the communication channels are ISDN B channels.

The invention is typically implemented using computer program products for the switches and service nodes involved. A computer program product includes a media with computer program code which causes the systems involved to perform the necessary operations. A switch which implements the invention includes a switching matrix, one or more peripheral modules connected to the switching matrix, one or more input/output devices connect the switching matrix, and a processor core which controls the operation of the switch and, during operation, contains the computer program code which implements the invention. A service node which implements the invention essentially includes similar components. However, the service node includes different computer program code. The invention operates in a communication network which includes at least one switch, one service node, and communication channels connected between.

Use of the present invention in a telecommunication network reduces the number of ports required on both switches and service nodes by using switch resources to capture mid call transfers and recover calls to the off switch system only as required. This reduction in the number of ports used to maintain calls results in significant transmission plant and port cost savings.

DETAILED DESCRIPTION OF THE PREFERRED EMBODIMENTS

Figure 1:
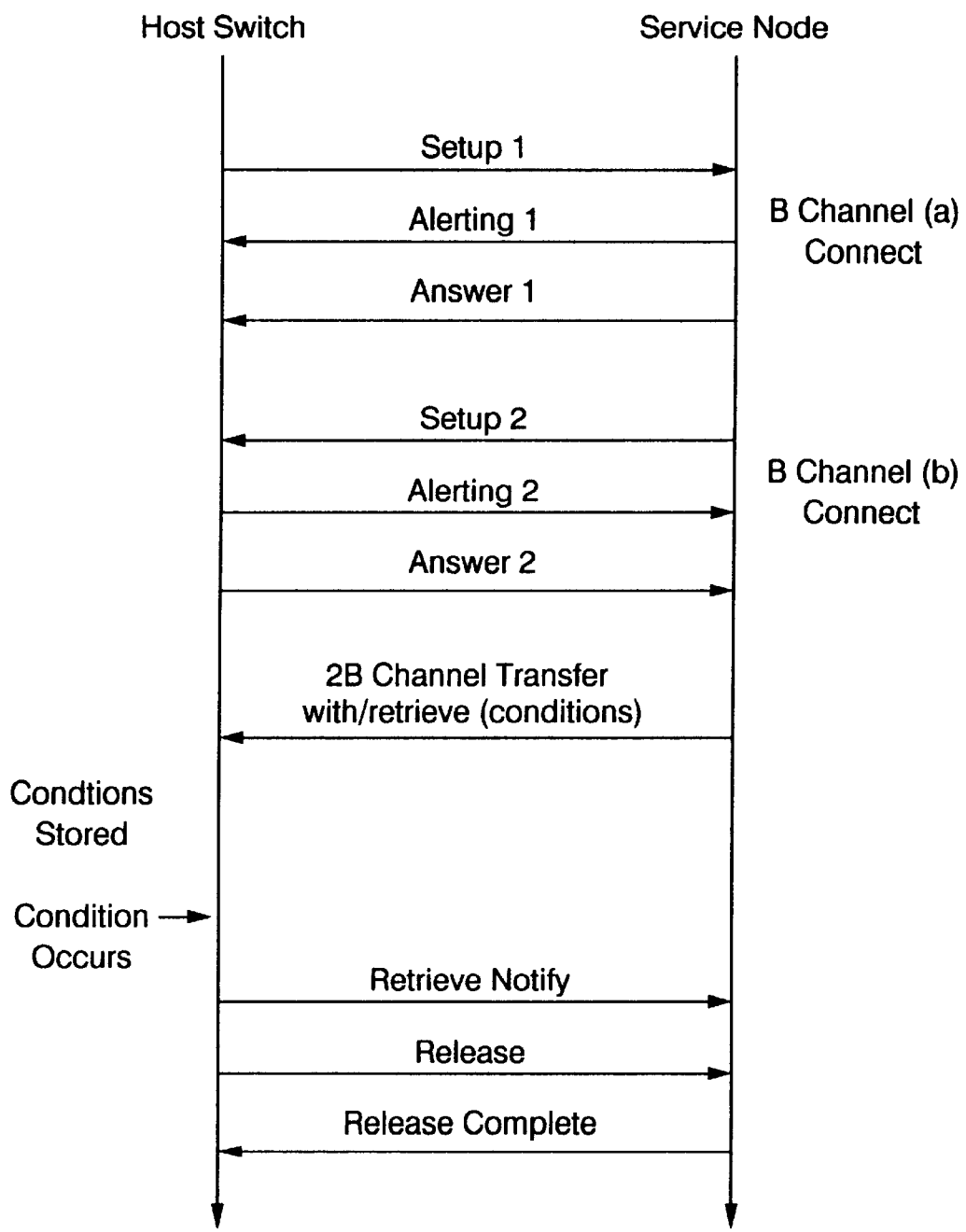
FIG. 1 is a message flow diagram which illustrates the messages exchanged between a host switch and a service node in one embodiment of the invention.

FIG. 1 illustrates an example of the message flows between a host switch and a service node in one embodiment of the present invention. Messages setup 1, alerting 1, and answer 1 are exchanged to connect a first call leg over B channel (a). Messages setup 2, alerting 2, and answer 2 are exchanged to connect a second call leg over B channel (b). The following message, "2 B channel transfer with retrieve", or just "transfer-with-retrieve", is an instruction from the service node to the host switch to transfer a call leg and release the B channels. However, according to the invention, this message includes conditions for retrieval.

The host switch in this case stores the retrieval conditions and waits for one of the conditions to occur. Any of many possible conditions may be chosen by a system designer to be conditions or events which trigger a call retrieval. Examples of such conditions include in-band tones, participant release, and the expiration of a specified interval of time. The communication interface involved is the PRI, and trunking is based on ISDN services user part (ISUP) messaging. In the preferred embodiment, protocols specified in the international telecommunication union (ITU) specifications Q.931 or Q.932 are used. In order to make sure the appropriate call leg is retrieved, the call leg must be specified in the transfer message with either a call reference number or a B channel designator. In the preferred embodiments of the invention, the messages exchanged between the switch and the service node are implemented as a new extension of the previously described messaging used for B channel transfer. The message which includes the conditions is an extension to the ISDN basic rate interface (BRI) and primary rate interface (PRI) for the purpose of identifying call legs and calls.

When one of the specified retrieval conditions occurs, the host switch retrieves the appropriate call leg. The switch then sends a retrieve notify message to notify the service node of the occurrence of the condition and the call retrieval. The original call legs stay in place until a participant releases, and which time a release message is sent from the switch to the service node. The service node then sends a release complete message to the switch and the call is complete.

Figure 2:
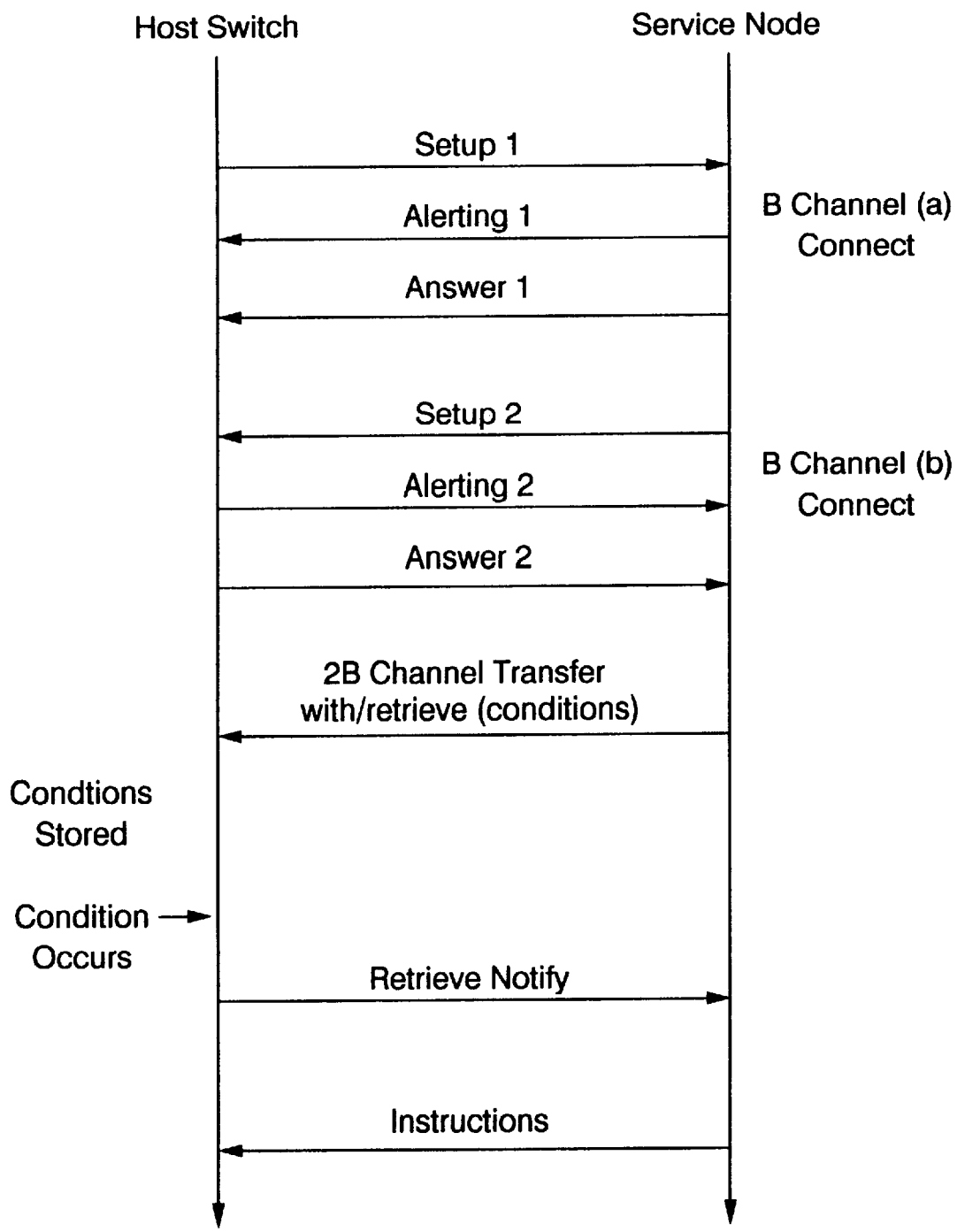
FIG. 2 is a message flow diagram which illustrates the message exchanged between a host switch and a service node in another embodiment of the invention.

FIG. 2 illustrates an example of the message flows between a host switch and a service node in another embodiment of the present invention. The message flow and the various actions by the switch and the service node are the same in this embodiment until after a retrieval condition occurs. In the case illustrated in FIG. 2, the service node sends an event notification message to the switch instead of a retrieve notification message. The service node than instructs the switch via a message or messages what action to take next. In many cases, the service node will instruct the switch to retrieve the call. However, this system is somewhat more versatile, since one of ordinary skill in the art could have other instructions sent to the switch at this time. Optionally, the switch could then notify the service node if any of the instructions cannot be carried out.

Figure 3:
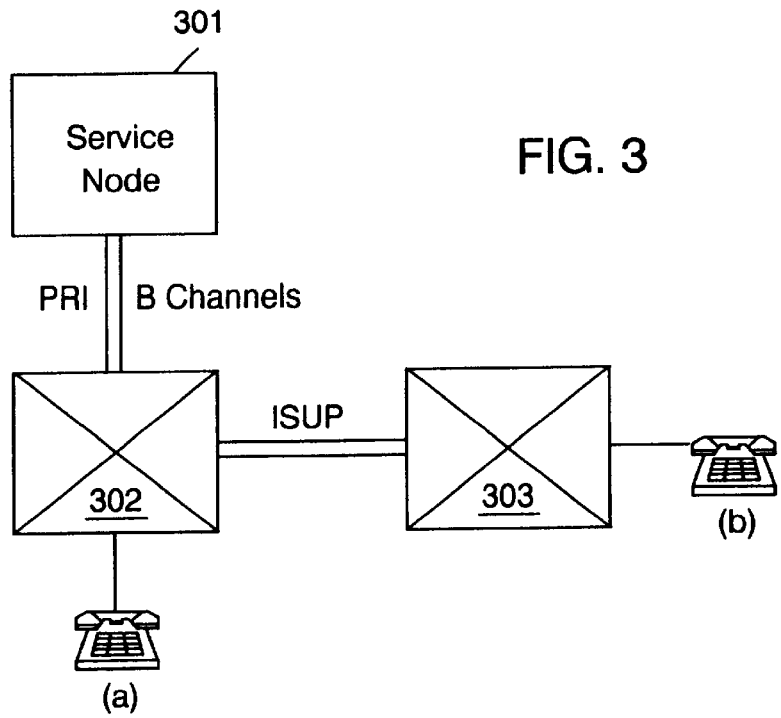
FIG. 3 illustrates an example network in which the invention is being used.

As an example, FIG. 3 shows a block diagram of part of a network in which the present invention is used. Service node 301 is connected to switch 302 via B channels. Switch 302 is connected to switch 303 through the PSTN via ISUP based trunks. To put FIG. 3 in the context of the voicemail example, user (a) is the voicemail subscriber who dials into the voicemail service node and retrieves a message from caller (b). User (a) can press a key which sends a tone to the service node 301 to direct the service node to return the call from caller (b). At this point, in the prior art, the service node would complete the call to caller (b) through switches 302 and 303, keeping two B channels tied up between the switch 302 and the service node 301. However, with the present invention, the service node 301 initiates a "2 B channel transfer with retrieve" and these B channels are released so that user (a) and caller (b) are connected only through switches 302 and 303 and any necessary intermediate switches and trunks. The B channels between the service node 301 and the switch 302 can be retrieved later when the retrieval conditions are met in accordance with the present invention.

Figure 4:
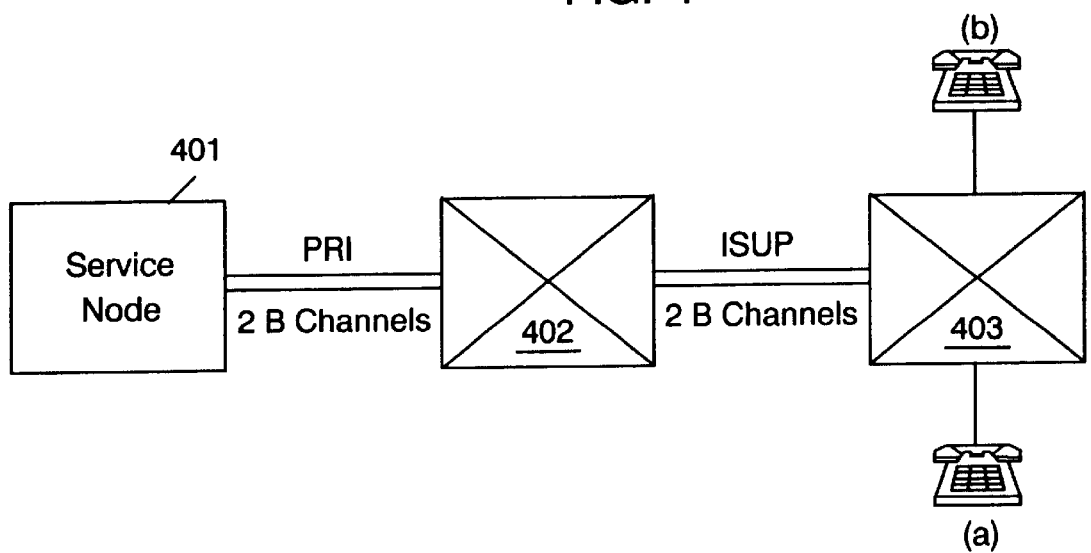
FIG. 4 illustrates another example network in which the invention is being used.

FIG. 4 shows another example block diagram of part of a network in which the present invention is used. In this example, user (a) calls into service node 401 through two switches, 402 and 403. The service node completes a call from user (a) to caller (b), thus tying up two B channels both on the PRI between the switch 402 and service node 401, and on the ISUP based trunk between switch 402 and 403. In this case, if both switches implement the present invention, it is possible to eliminate the extra B channels between service node 401 and switch 402, and the extra B channels switch 402 and switch 403, since user (a) and caller (b) can communicate using only switch 403. Even if only switch 402 implements the invention, the PRI B channels can be released during the call from (a) to (b). This example illustrates the possibility of having a switch which implements the invention connected through other switches as well as directly, assuming the other switches know how to respond to the messages used to implement the invention. As far as the operation of the invention is concerned, the connections between user (a) and the service node are treated as one call leg and the connections between caller (b) and the service node are treated as one call leg.

Figure 5:
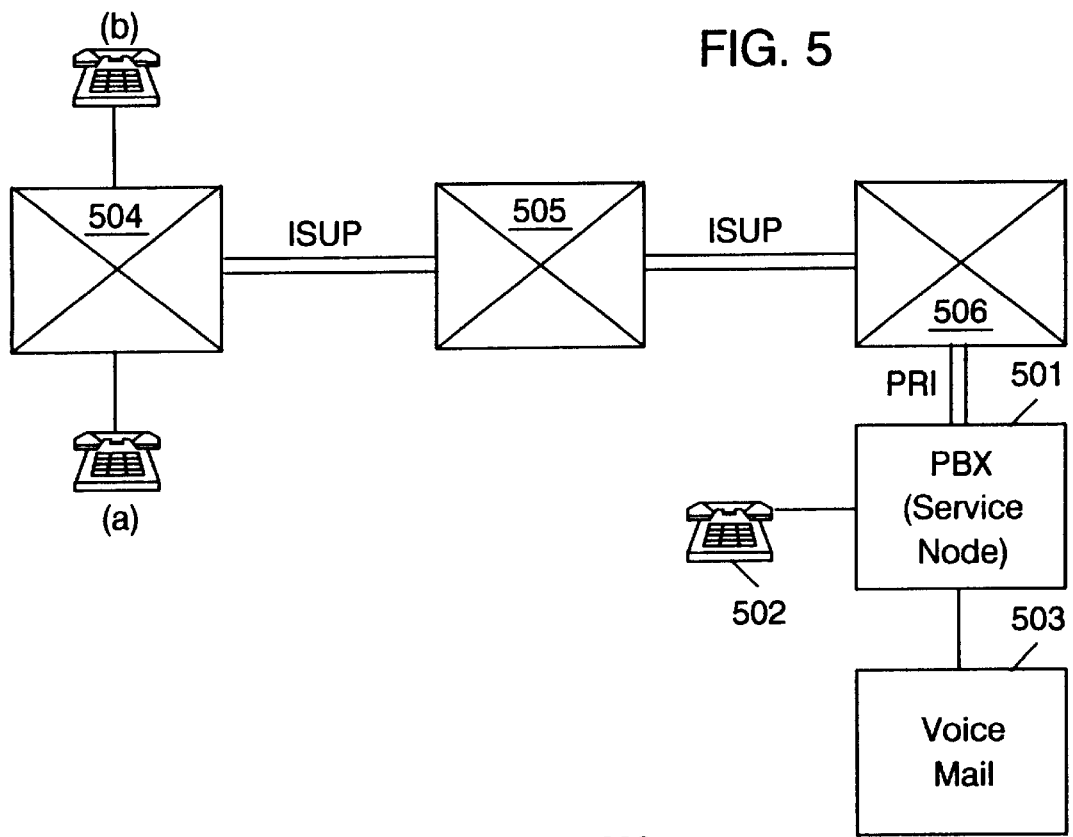
FIG. 5 illustrates another example network in which the invention is being used.

FIG. 5 shows another example block diagram of part of a network in which the present invention is used. In FIG. 5, the private branch exchange (PBX) 501 is the "service node" for purposes of implementing the present invention. PBX 501 presumably interfaces with many local users 502, a voicemail system 503 and at least one public network switch 506. The PBX 501 is connected to switch 506 via a PRI. In this case, user (a) calls into the PBX to use any of various services. This first call leg goes through switches 504 and 505 in addition to switch 506. At some point, user (a) directs that a call be completed to party (b). Since both (a) and (b) are on the same switch, all the B channels in the call path between switch 504 and PBX 501 could be released if the present invention were employed. Even if the invention were employed only at switch 506 and the PBX, the PRI B channels between these two devices could still be released, to be retrieved later when specified conditions are met.

Figure 8:
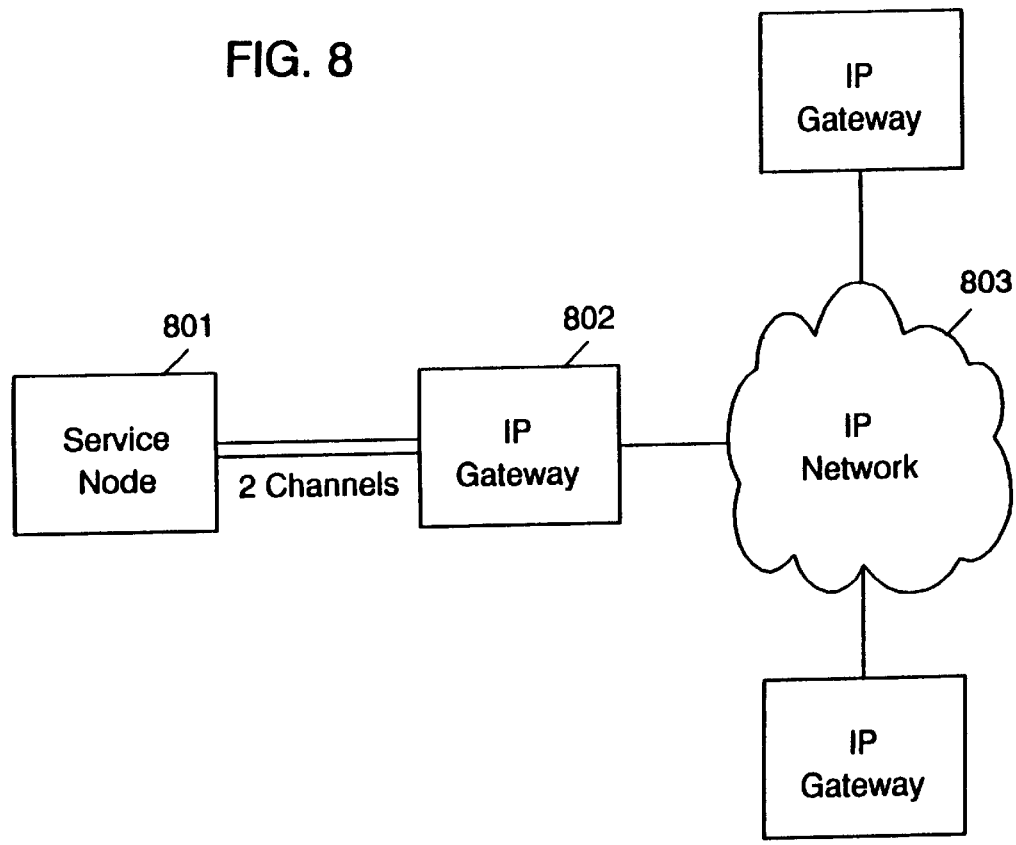
FIG. 8 illustrates an IP network in which the invention is used.

The invention could also be implemented in a different type of telecommunication network with appropriate changes to the messages, which will be readily understood by those skilled in the art. For example, the invention can be implemented in an internet protocol (IP) telephony network. Information is exchanged in such a network between terminals and switches based on the International Telecommunications Union (ITU) standard H.323 using a ITU standard H.225 protocol. The H.225 protocol is based on the Q.931 protocol previously discussed. FIG. 8 illustrates an IP telephony network. The user terminals in FIG. 8 are omitted for simplicity. Service node 801 is connected two switch 802 by a communication path that can support at least 2 channels. In an IP telephony network, the switches are called IP gateways. A large packet or cell switched network called an IP network 803 interconnects IP gateways. All of the previous discussion applies to the invention implement in IP telephony networks. Multiple levels of channels can be released depending on which IP gateways have implemented the invention, just as described in FIG. 5 for public telephone networks.

Figure 6:
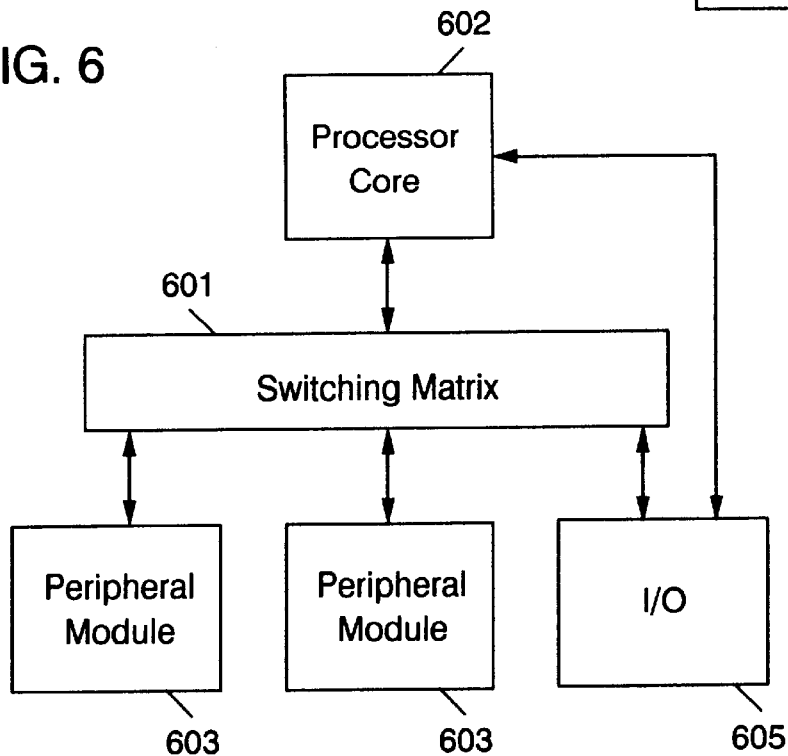
FIG. 6 is a functional block diagram of a switch or service node in which the invention has been implemented.

FIG. 6 illustrates a conceptual, functional block diagram of a service node or a switch or gateway which implements the invention. Processor core 602 includes a central processing unit, memory, and supporting circuitry. This processor core, together with any computer program code stored in memory is the means for controlling the overall operation of the switch, gateway, or service node. Switching matrix 601 allows the processing core to communicate with the other components. The switching matrix 601 includes one or more buses and accompanying internal circuitry. Input/output (I/0) module 605 is also connected to the switching matrix and includes removable media devices to load computer program code. The 1/0 module also includes devices for connection to workstations and similar equipment. The peripheral modules 603 are connected to the switching matrix 601 and are managed by the processor core 602. The peripheral modules 603 provide an interface to various networks including various types of line interfaces, as well as trunk interfaces into the public switched telephone network (PSTN). In an ISDN environment, a switch which is used in implementing the invention and a service node which is used in implementing the invention have essentially the same main hardware components described above. The main difference between them is the software used and the specifics of the various elements. For example, they might have peripheral modules which differ in some respects because they must interface with different types of networks.

Figure 7:
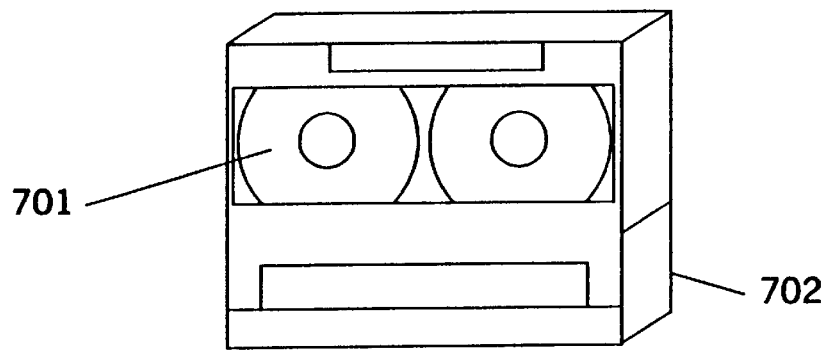
FIG. 7 is a drawing of a computer program product which includes computer program code for implementing the present invention.

Appropriate computer program code in combination with hardware implements many of the elements of the present invention. This computer program code is often stored on storage media. This media can be a diskette, hard disk, CD-ROM, or tape. The media can also be a memory storage device or collection of memory storage devices such as read-only memory (ROM) or random access memory (RAM). Additionally, the computer code can be transferred to the switch, gateway, or service node over some type of data network. FIG. 7 illustrates one example of a media. FIG. 7 shows a tape cartridge of the type where magnetic media 701 is enclosed in a protective cassette 702. Magnetic field changes over the surface of the magnetic media 701 are used to encode the computer program code. In this way the computer program code is stored for transport and later retrieval.

We have described specific embodiments of our invention which provides for channel transfer and conditional retrieval in a telecommunication system. One of ordinary skill in the networking and computing arts will quickly recognize that the invention has other applications in other environments. In fact, many embodiments and implementations are possible. The following claims are in no way intended to limit the scope of the invention to the specific embodiments described.

We claim:

1. In a switch, a method of transferring call legs while allowing conditional retrieval, the method comprising the steps of:
   connecting a first call wherein one leg of the first call is connected between the switch and a service node;
   connecting a second call wherein one leg of the second call is connected between the switch and the service node;
   receiving a transfer-with-retrieve message containing retrieval conditions;
   storing the retrieval conditions while transferring a call leg; and
   retrieving and reconnecting the call leg after one or more of the retrieval conditions have occurred.

2. The method of claim 1 wherein one of the retrieval conditions is a participant release.

3. The method of claim 1 wherein one of the retrieval conditions is the elapse of a specified interval of time.

4. The method of claim 1 wherein one of the retrieval conditions is the presence of in-band tones.

5. The method according to any of claims 1 through 4 wherein the call leg is connected over an integrated services digital network (ISDN) B channel.

6. The method of claim 1 wherein the switch is an internet protocol gateway.

7. In a switch, a method of transferring call legs while allowing conditional retrieval, the method comprising the steps of.
   connecting a first call wherein one leg of the first call is connected between the switch and a service node;
   connecting a second call wherein one leg of the second call is connected between the switch and the service node;
   receiving a transfer-with-retrieve message containing retrieval conditions;
   storing the retrieval conditions while transferring a call leg; and
   notifying the service node when one or more of the retrieval conditions have occurred.

8. The method of claim 7 wherein one of the retrieval conditions is a participant release.

9. The method of claim 7 wherein one of the retrieval conditions a elaspe of a specified interval of time.

10. The method of claim 7 wherein one of the retrieval conditions is the presence of in-band tones.

11. The method according to any of claims 7 through 10 wherein the call leg is connected over an integrated services digital network (ISDN) B channel.

12. The method of claim 7 wherein the switch is an internet protocol gateway.

13. In a service node, a method of transferring call legs while allowing conditional retrieval, the method comprising the steps of:
   connecting a first call where one leg of the first call is connected between a switch and the service node;
   connecting a second call wherein one leg of the second call is connected between the switch and the service node;
   sending a transfer-with-retrieve message containing retrieval conditions to the switch; and
   receiving notification message when one or more of the retrieval conditions have occurred.

14. The method of claim 13 further comprising the step of directing the switch to take an action based on the retrieval conditions indicated in the notification message.

15. A computer program product for causing a switch to transfer call legs while allowing conditional retrieval, the computer program product having a medium with a computer program embodied thereon, the computer program comprising:
   computer program code for connecting a first call wherein one leg of the first call is connected between the switch and a service node;
   computer program code for connecting a second call wherein one leg of the second call is connected between the switch and the service node;
   computer program code for receiving a transfer-with-retrieve message containing retrieval conditions;
   computer program code for storing the retrieval conditions while transferring a call leg; and
   computer program code for retrieving and reconnecting the call leg after one or more of the retrieval conditions have occurred.

16. The computer program product of claim 15 wherein one of the retrieval conditions is a participant release.

17. The computer program product of claim 15 wherein one of the retrieval conditions is the elapse of a specified interval of time.

18. The computer program product of claim 15 wherein one of the retrieval conditions is the presence of in-band tones.

19. The computer program product according to any of claims 15 through 18 wherein the call leg is connected over an integrated services digital network (ISDN) B channel.

20. The computer program product of claim 15 wherein the switch is an internet protocol gateway.

21. A computer program product for causing a switch to transfer call legs while allowing conditional retrieval, the computer program product having a medium with a computer program embodied thereon, the computer program comprising:
   computer program code for connecting a first call wherein one leg of the first call is connected between the switch and a service node;
   computer program code for connecting a second call wherein one leg of the second call is connected between the switch and the service node;
   computer program code for receiving a transfer-with-retrieve message containing retrieval conditions;
   computer program code for storing the retrieval conditions while transferring a call leg; and
   computer program code for notifying the service node when one or more of the retrieval conditions have occurred.

22. The computer program product of claim 21 wherein one of the retrieval conditions is a participant release.

23. The computer program product of claim 21 wherein one of the retrieval conditions is a elapse of a specified interval of time.

24. The computer program product of claim 21 wherein one of the retrieval conditions is the presence of in-band tones.

25. The computer program product according to any of claims 21 through 24 wherein the call leg is connected over an integrated services digital network (ISDN) B channel.

26. The computer program product of claim 21 wherein the switch is an internet protocol gateway.

27. A computer program product for causing a service node to transfer call legs while allowing conditional retrieval, the computer program product having a medium with a computer program embodied thereon, the computer program comprising:
   computer program code for connecting a first call where one leg of the first call is connected between a switch and the service node;
   computer program code for connecting a second call wherein one leg of the second call is connected between the switch and the service node;
   computer program code for sending a transfer-with-retrieve message containing retrieval conditions to the switch; and
   computer program code for receiving a notification message when one or more of the retrieval conditions have occurred.

28. The computer program product of claim 27 further including computer program code for directing the switch to take an action based on the retrieval conditions indicated in the notification message.

29. Apparatus which can effect the transfer of call legs while allowing conditional retrieval, the apparatus comprising:
   a switching matrix;
   one or more peripheral modules connected to the switching matrix;
   one or more input/output devices connected to the switching matrix; and
   a processor core connected to the switching matrix, the processor core for controlling the operation of the switch, the processor core containing computer program code for transferring a call leg while allowing conditional retrieval by receiving a transfer-with-retrieve message containing retrieval conditions, storing the retrieval conditions, and notifying a service node when one or more of the retrieval conditions has occurred.

30. The apparatus of claim 29 wherein the processor core further includes computer program code for retrieving and reconnecting the call leg when one or more of the conditions have occurred.

31. A service node which can effect the transfer of call legs while allowing conditional retrieval, the service node comprising:
   a switching matrix;
   one or more peripheral modules connected to the switching matrix;
   one or more input/output devices connected to the switching matrix; and
   a processor core connected to the switching matrix, the processor core for controlling the operation of the service node, the processor core containing computer program code for transferring call legs while allowing conditional retrieval by sending a transfer-with-retrieve message containing retrieval conditions to a switch, and receiving a notification message when one or more of the retrieval conditions have occurred.

32. Apparatus for transferring call legs while allowing conditional retrieval, the apparatus comprising:
   means for connecting a first call wherein one leg of the first call is connected between a switch and a service node;
   means for connecting a second call wherein one leg of the second call is connected between the switch and the service node;

means for receiving a transfer-with-retrieve message containing retrieval conditions;

means for storing the retrieval conditions while transferring a call leg; and means for notifying the service node when one or more of the retrieval conditions have occurred.

33. The apparatus of claim 32 wherein the switch is an internet protocol gateway.

34. Service node apparatus for transferring call legs while allowing conditional retrieval, the apparatus comprising:

means for connecting a first call where one leg of the first call is connected between a switch and the service node;

means for connecting a second call wherein one leg of the second call is connected between the switch and the service node;

means for sending a transfer-with-retrieve message containing retrieval conditions to the switch; and means for receiving a notification message when one or more of the retrieval conditions have occurred.

35. A telecommunication network comprising:

a switch including a first switching matrix, a first peripheral module connected to the first switching matrix, and a first processor core connected to the first switching matrix, the first processor core for controlling the operation of the switch, the first processor core containing computer program code for transferring call legs while allowing conditional retrieval by receiving a transfer-with-retrieve message containing retrieval conditions, storing the retrieval conditions, and sending a notification message when one or more of the retrieval conditions has occurred;

a service node including a second switching matrix, a second peripheral module connected to the second switching matrix, and a second processor core connected to the second switching matrix, the second processor core for controlling the operation of the service node, the second processor core containing computer program code for transferring call legs while allowing conditional retrieval by sending a transfer-with-retrieve message containing retrieval conditions to a switch, and receiving a notification message when one or more of the retrieval conditions have occurred; and at least two communication channels disposed between the switch and the service node.

36. A telecommunication network including a switch and a service node, the telecommunication network comprising:

means for connecting a first call wherein one leg of the first call is connected between the switch and a service node;

means for connecting a second call wherein one leg of the second call is connected between the switch and the service node;

means for sending a transfer-with-retrieve message containing retrieval conditions from the service node to the switch;

means for storing the retrieval conditions while transferring a call leg at the switch;

means for retrieving and reconnecting the call leg at the switch when one or more of the retrieval conditions have occurred; and means for sending a notification message from the switch to the service node when one or more of the retrieval conditions have occurred.

37. The network according to claim 35 or claim 36 wherein the switch is an internet protocol gateway.

* * * * *